United States Patent [19]

Kautt

[11] Patent Number: 5,072,495
[45] Date of Patent: Dec. 17, 1991

[54] INSTALLATION FOR AUTOMATIC ASSEMBLY OF SOCKET-BRACKET

[75] Inventor: M. J. Kautt, Strasbourg, France

[73] Assignee: Ferco International Usine De Ferrures De Batiment, Sarrebourg, France

[21] Appl. No.: 539,342

[22] Filed: Jun. 18, 1990

[30] Foreign Application Priority Data

Jun. 21, 1989 [FR] France .................... 89 08291

[51] Int. Cl.⁵ .................... B23P 19/06; B23Q 41/02
[52] U.S. Cl. ........................ 29/33 K; 29/11; 29/813
[58] Field of Search ............ 29/33 K, 33 P, 11, 525.1, 29/407, 787, 792, 795, 783, 785, 813, 240, 809

[56] · References Cited

U.S. PATENT DOCUMENTS

| 3,088,198 | 5/1963 | Svensen | 29/795 X |
| 3,825,988 | 7/1974 | Harrdick et al. | 29/783 X |
| 4,258,459 | 3/1981 | Cantini | 29/33 K |
| 4,774,759 | 10/1988 | Makoto et al. | 29/809 |

FOREIGN PATENT DOCUMENTS

| 131979 | 2/1933 | Austria | 29/11 |
| 65373 | 5/1977 | Japan | 29/813 |
| 27177 | 3/1978 | Japan | 29/809 |
| 929402 | 5/1982 | U.S.S.R. | 29/783 |

Primary Examiner—William Briggs
Attorney, Agent, or Firm—Fidelman & Wolffe

[57] ABSTRACT

The invention discloses an installation for the automatic assembly of the lower socket-bracket of opening leaves, i.e. the part of the fitting intended to be fixed to the lower corner of an opening leaf preferably of oscillating leaf type, in line with its vertical axis of rotation and transferring the weight of the leaf to a bearing embedded in the frame.

The automatic installation is essentially formed of an installation 100 for equipping the socket, formed of workstations disposed about a rotary bed-plate and an installation 200 for the automatic assembly of the bracket on the socket formed of work stations disposed in a reference plane P—P. These two installations 100 and 200 are associated together via an automatic transfer mechanism 30.

The invention makes possible the equipping and assembling of socket-brackets, completely automatically, all the operations following each other in a continuous flow.

20 Claims, 8 Drawing Sheets

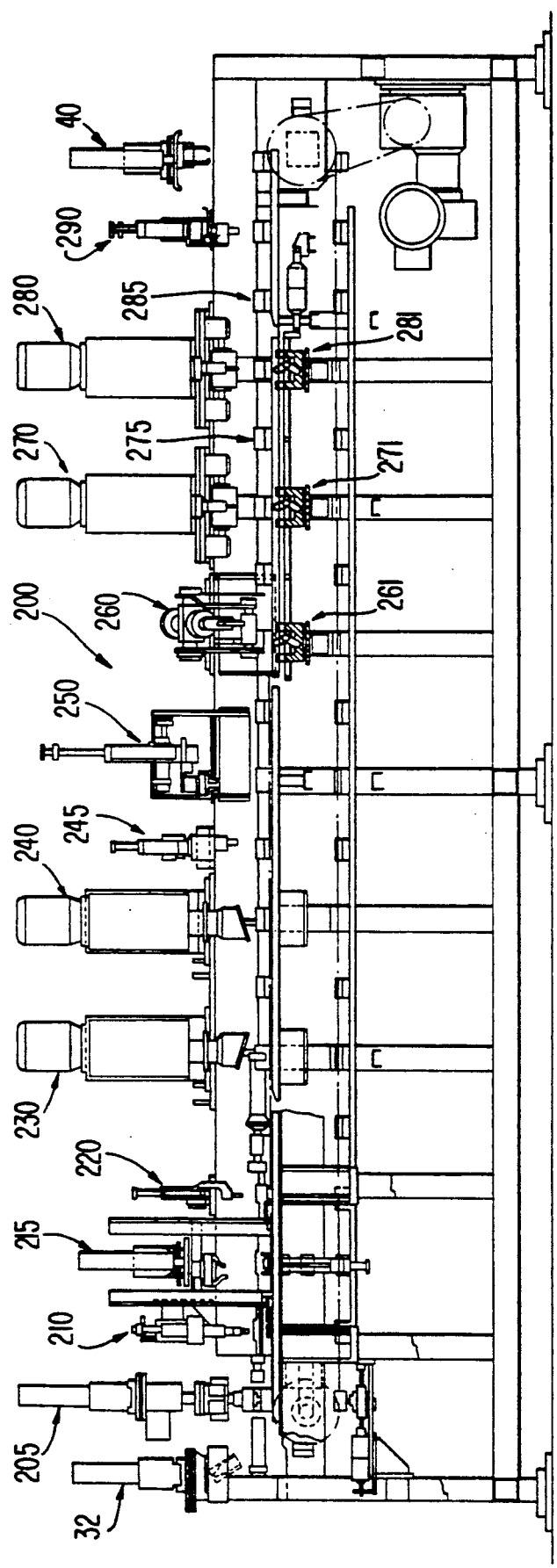

INSTALLATION FOR AUTOMATIC ASSEMBLY OF SOCKET-BRACKET invention relates to an installation for the automatic assembly of the lower socket-bracket of opening leaves, for example of doors.

This part of the fitting is intended to be fixed on the lower corner of an opening leaf in line with its axis of rotation.

In order to better understand the object of the invention, this lower socket-bracket is shown in FIG. 1. It comprises a first part 1 including the socket 1.1 forming the hinge part of the opening leaf. This socket 1.1 cooperates with a part usually called angle support, fixed to the frame and comprising a hinge pin housed from underneath, in socket 1.1, when the leaf is fitted to the frame.

In the case of an oscillating leaf frame, this hinge pin allows the leaf to swing French fashion with respect to a vertical axis and it may also itself swing with respect to a horizontal axis to allow opening of the leaf while moving down.

On the end of this pin of the angle support, the leaf bears via the socket. The purpose of such bearing is to provide a very smooth rotational movement. For this, the end of the pin is spherical and at the bottom of the cylindrical orifice of the socket is provided a plastic material stop or pad 2 which facilitates the rotation of the pin and prevents binding of the socket and of the pin when the leaf swings.

Furthermore, two adjustment screws 3 and 4 are provided on socket 1.1. The first adjustment screw 3, called upper adjustment screw hereafter, permits vertical adjustment of the leaf once set on the frame. The second screw 4, called lateral adjustment screw hereafter, permits horizontal adjustment transversal to the plane of the framework of the frame. Generally a third adjustment screw is provided on the angle support for the horizontal adjustment parallel to the framework.

The bearing of the angle support is bored or milled using a template in the frame. The stability of the leaf is thus ensured. Any collapse is practically impossible, even in the case of a heavy load for the weight of the leaf is applied to the bracket formed of a second part 1.2 of part 1 forming the vertical arm of the socket-bracket and by an added part 5, itself in the form of a right-angle bracket, forming the horizontal arm, this bracket (1.2, 5) being housed in a rabbet of the leaf. The weight of the leaf is thus transferred to the bearing embedded in its housing. This steel bracket 5 is fixed, as shown in FIG. 1, to element 1 by riveting to the lower surface of element 1 and to its surface 1.3.

For greater clearness, element 1 will be called socket generally hereafter.

The object of the invention is to provide an assembly line for the totally automatic assembly of such a socket-bracket, in particular for oscillating leaf frames.

It is known to assemble the different parts of element 1 using an automatic machine. This machine in general comprises a rotary bed-plate about which the work stations are disposed for positioning one or more adjustment screws on the socket.

Bracket 5 is then generally assembled with element 1 traditionally in a press by riveting in two passes, one in one direction and the other in a direction perpendicular to the first one.

These successive assembling operations, because of their manual character, result in a high production cost because of the multiple handling operations and dead time due to taking up, positioning and assembling the parts. In addition, since the assembly times are inherent to the know-how and skill of the operator, great variations can be observed in the manufacturing cycles and quality, which adversely affects the profitability and productivity. In fact, the operator must take two first elementary parts from containers (where they are placed loosely in categories), assemble them by hand then introduce them into a riveting station for joining them together, and then check correct execution thereof.

Such handling operations are long and fastidious because of their repetitiveness and rapidly lead to substantial lowering of efficiency.

The purpose of the present invention is then to overcome these different drawbacks and for this relates to an assembling installation totally automating these different operations and providing in addition the automatic positioning of stop 2 during automatic fitting of the different parts of socket 1.

Besides the operations already automated in existing installations, the invention makes therefore possible the automatic assembly of the plastic material stop of the socket and automatic riveting of the angle bracket, all the operations following each other in a continuous flow.

For this, the installation for the automatic supply and assembly of elementary parts, in particular parts forming a socket-bracket, formed of a hinge socket with two adjustment screws, horizontal and vertical, and a plastic material stop, and a bracket, these two assembled parts forming a right-angle bracket intended to be housed in a rabbet of the leaf, particularly an oscillating leaf, the socket being intended to cooperate with an angle support fixed to the frame, comprises an installation for automatic fitting of the socket comprising a rotary step by step bed-plate feeding the socket to a station for distributing and positioning the upper adjustment screw, a station for distributing and positioning the lateral adjustment screw, a station for checking the positioning of the two adjustment screws; this installation is remarkable in that with this installation for fitting out the socket is associated an installation for the automatic assembly of the bracket on the socket, via an automatic transfer mechanism.

Another important characteristic of the invention resides in the fact that the installation for automatically equipping the socket comprises a station for positioning the plastic material stop.

The invention is described hereafter in greater detail with reference to the drawings which show only one embodiment.

FIGS. 5A and 5B are partial elevational and top views, on a larger scale, of the assembly line, showing more precisely the installation for automatic assembly of the socket and of the bracket;

Figure 1:
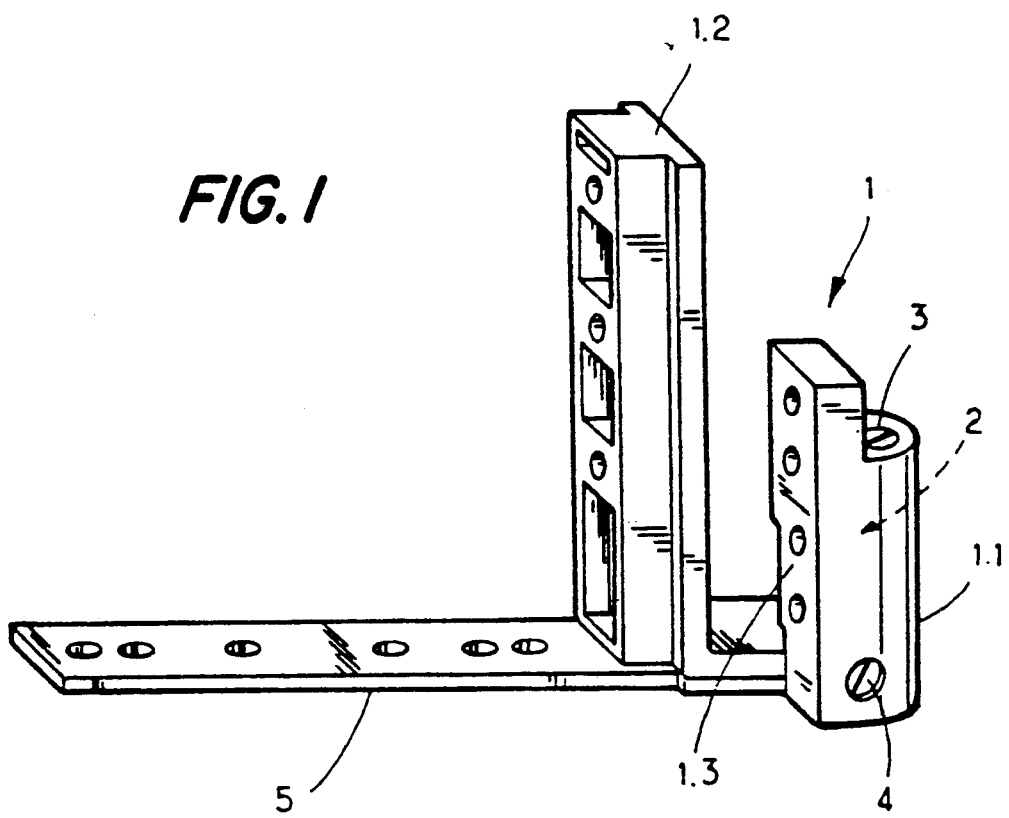
FIG. 1 is an isometric view of a socket-bracket which is assembled according to the invention.
Figure 2:
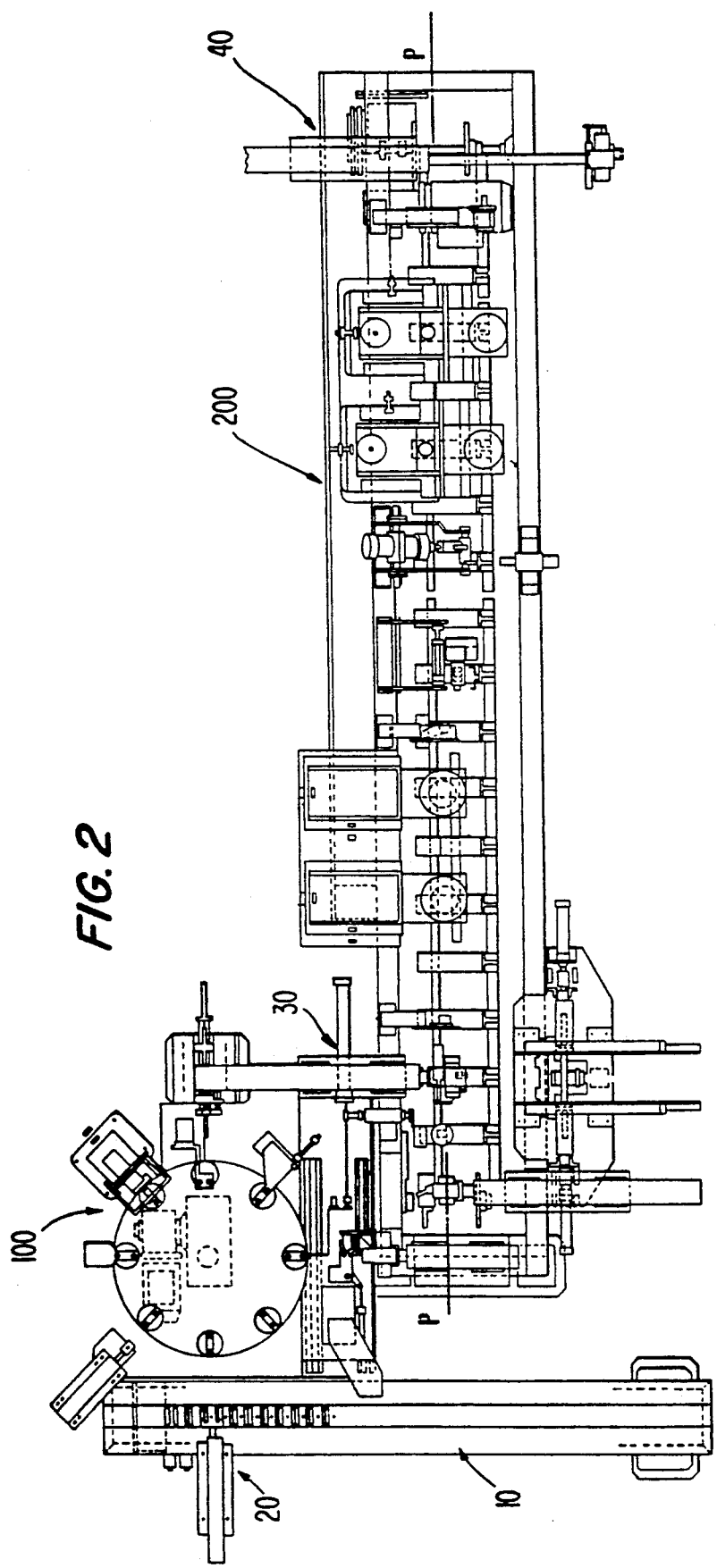
FIG. 2 is an overall top view of the assembly line according to the invention.

FIG. 2 shows a general top view of the installation. It comprises upstream a loading conveyor 10 formed conventionally of an endless belt or band feeding the sockets 1, whatever their pattern and whether right or left, to the level of a loading handler 20 which loads these sockets 1 on to the rotary bed-plate of the automatic equipping installation 100.

This equipping installation 100 is formed of a rotary bed-plate about which are disposed the stations for assembly of the parts 2, 3, 4 on socket 1. At the output of this equipping installation 100 is disposed a transfer station 30 by means of which the defective parts are removed and the correct parts transferred to the automatic assembly installation 200. For this, the transfer station 30 performs a vertical rotation of 180°, namely turning the sockets over, then horizontal pivoting thereof through 90°.

The installation 200 for automatic assembly of bracket 5 on socket 1 is formed of modular work stations disposed in a reference plane PP for assembling bracket 5 on the equipped socket 1. It ends downstream in a discharge station 40 which transfers the correct parts and removes the defective parts.

Figure 3:
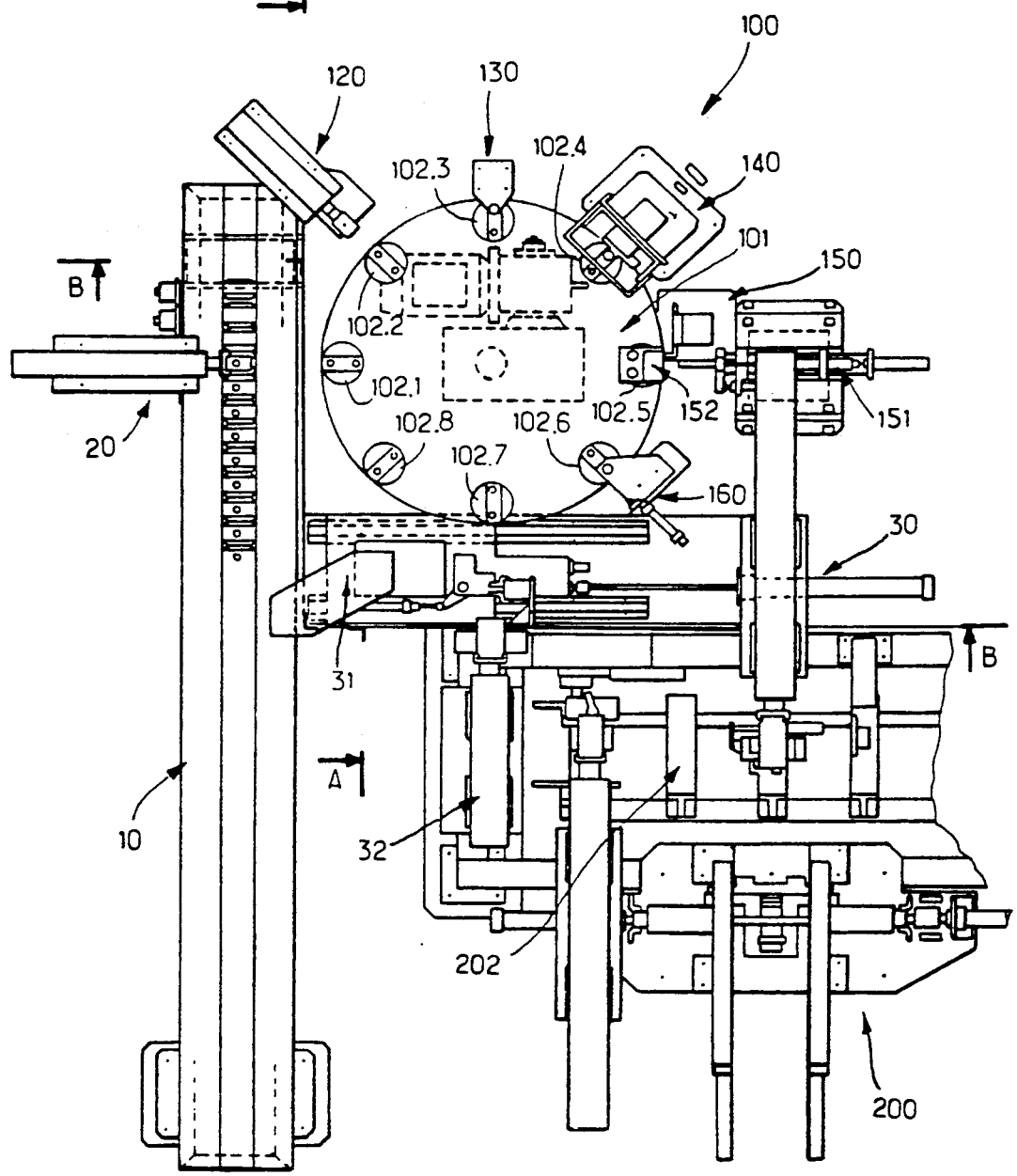
FIG. 3 is a partial top view on a larger scale of the assembly line showing more precisely the installation for equipping the socket.

FIG. 3 shows in detail on a larger scale the loading conveyor 10 and the installation 100 for automatically equipping the socket.

The loading handler 20 formed preferably of a gripping member disposed on the rod of a horizontal jack loads socket 1 on a support plate 102 disposed on the rotary bed-plate 101. This support plate 102 is provided with positioning elements which are double so as to accommodate loading of a right-hand socket or a left-hand socket. In all, the rotary bed-plate 101 is provided with eight support plates distributed over its periphery.

Figure 6A:
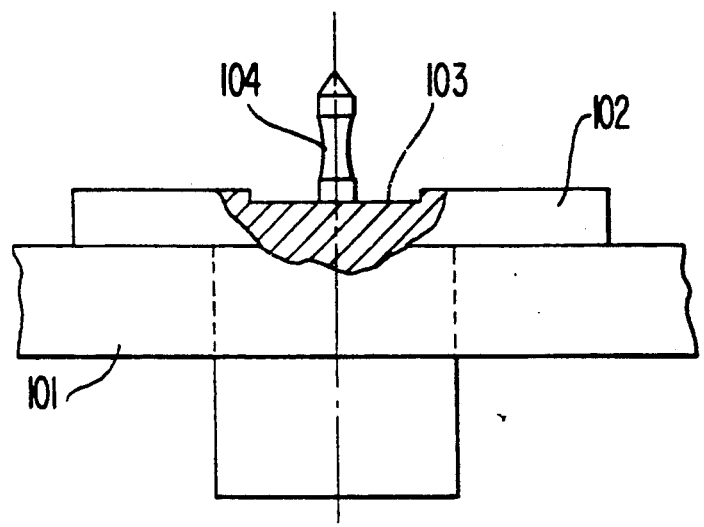
FIG. 6A is a sectional view through C—C of the support plate of the socket equipping the installation and FIG. 6B a top view of this support plate with a deposited socket.
Figure 6B:
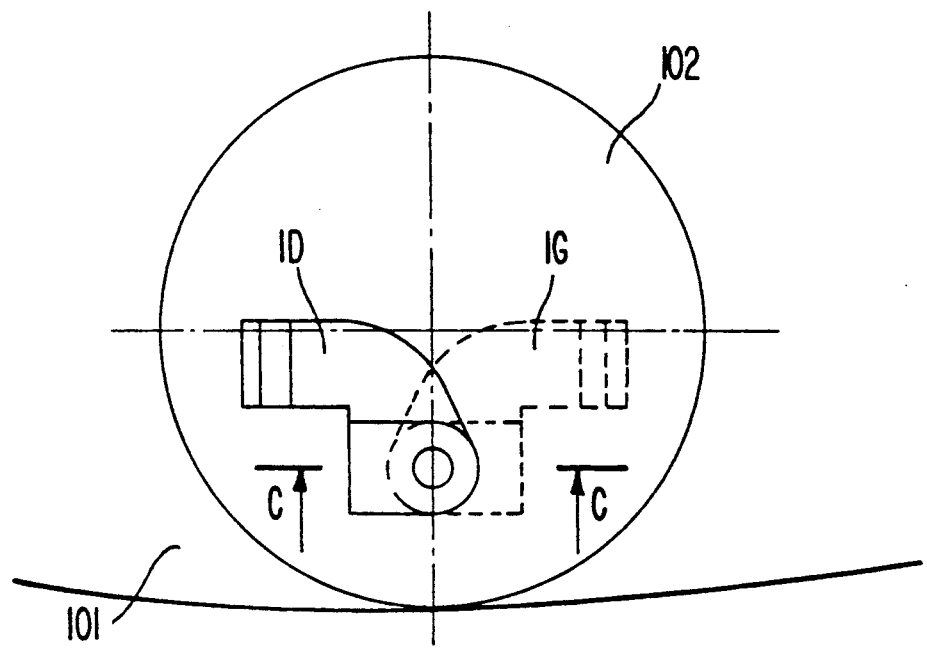

FIGS. 6A and 6B show a support plate 102 in detail.

The support plate has a circular depositing surface and comprises a groove 103 and a tenon 104, the latter is to be fitted into socket 1 from the bottom. Groove 103 is adapted so as to receive either a right-hand socket 1D or a left-hand socket 1G. It receives more precisely the lowest part of the socket, of a level lower than the L shaped portion of socket 1 which is intended to receive the bracket 5.

The rotary bed-plate 101 is controlled so as to rotate step by step from each of the eight positions 102.i to the next, i.e. with a step of one eighth of a revolution. For this, a drive mechanism is provided under the bed-plate.

A socket 1 is automatically equipped in the following way.

The loading handler 20 loads a socket 1 on to a support plate 102 in position 102.1. The bed-plate rotates through an eighth of a revolution to reach position 102.2.

At this position, the socket is brought to a station 120 for positioning the plastic material stop 2. This stop 2 is provided with a spur for retaining it in the cylindrical hole of socket 1. The station for positioning stop 120 comprises a bowl for storing the stops, at the output of which is disposed a stop positioning device. A vertical translational gripper introduces the positioned stop in the cylindrical hole of the socket.

After an eighth of a revolution of the rotary bed-plate 101, the socket reaches position 102.3. Here is provided a station for checking the positioning of stop 130, formed preferably of a mechanical feeler checking the presence and correct position of the stop, through a finger controlled by a jack and having reference marks. The rotary bed-plate 101 then rotates through a further eighth of a revolution.

The socket, still disposed on its support plate 102, then arrives in position 102.4. It is then ready to be treated by station 140 for distributing and positioning the upper screw 3. This station comprises a device for storing the upper screws 3, a gripping, positioning and automatic screwing device with vertical screwing head.

The bed-plate then rotates through an eighth of a revolution so that the socket comes to position 102.5 and is subjected to a station 150 distributing and positioning the lateral adjustment screw 4. This station has a construction equivalent to station 140, with a horizontal screwing head. With the screwing device 151 is associated a flanging device 152 with vertical movement and holding socket 1 in position on support plate 102. Furthermore, the horizontal screwing head is movable horizontally and perpendicularly to the screwing direction, so as to be able to position and screw the lateral adjustment screw 4 of a right-hand socket 1D or a left-hand socket 1G.

Through an eighth of a revolution of the bed-plate, the socket in position 102.6 arrives in a station 160 for checking the positioning of the two adjustment screws 3 and 4, formed essentially of two horizontal and vertical feelers, similar to that of station 130.

Finally, the support plate 102 with the equipped socket is brought to position 102.7 where it is subjected to the transfer station 30 so as to be transferred to the installation for automatic assembly of the bracket. At the level of this transfer mechanism 30 is provided a chute for removing defective parts 31, shown in FIG. 3 in a retracted position. If a defective part has been detected by the checking stations, chute 31 is positioned in front of position 102.7 and the defective part is removed thereto. The intermediate transfer station 30 comprises essentially an unloading handler 32 with a gripping and displacement device such that the equipped socket is turned vertically through 180° then is swung horizontally through 90° to be positioned on an elongate plate 202 supporting the parts along the automatic assembly installation 200. These plates 202 are such that a single type of plate allows all the operations of the assembly installation 200 whatever the type of socket and whether the socket-bracket formed is right-handed or left-handed.

The rotation through an eighth of a revolution of the bed-plate brings support plate 102 unloaded of its part into position 102.8 which is a free station.

Of course, these operations take place continuously and automatically, all the stations 20, 120 to 160, 30 operating at each rotation of an eighth of a revolution of the rotary bed-plate 101.

Figure 4A:
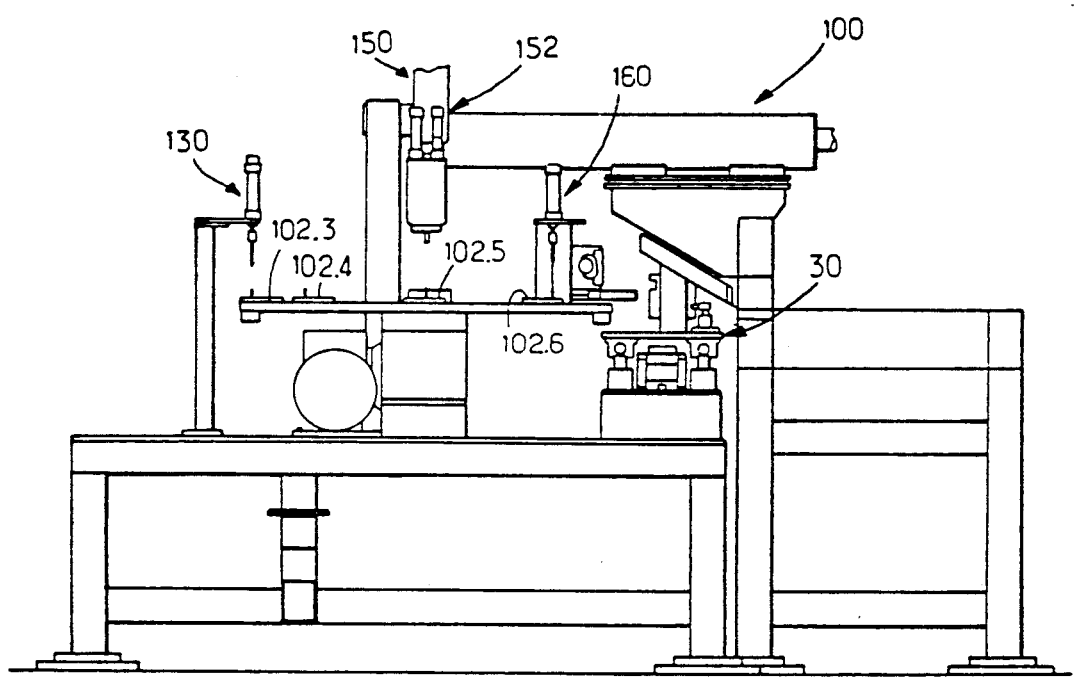
FIGS. 4A and 4B are sectional views through A—A and B—B of FIG. 3.
Figure 4B:
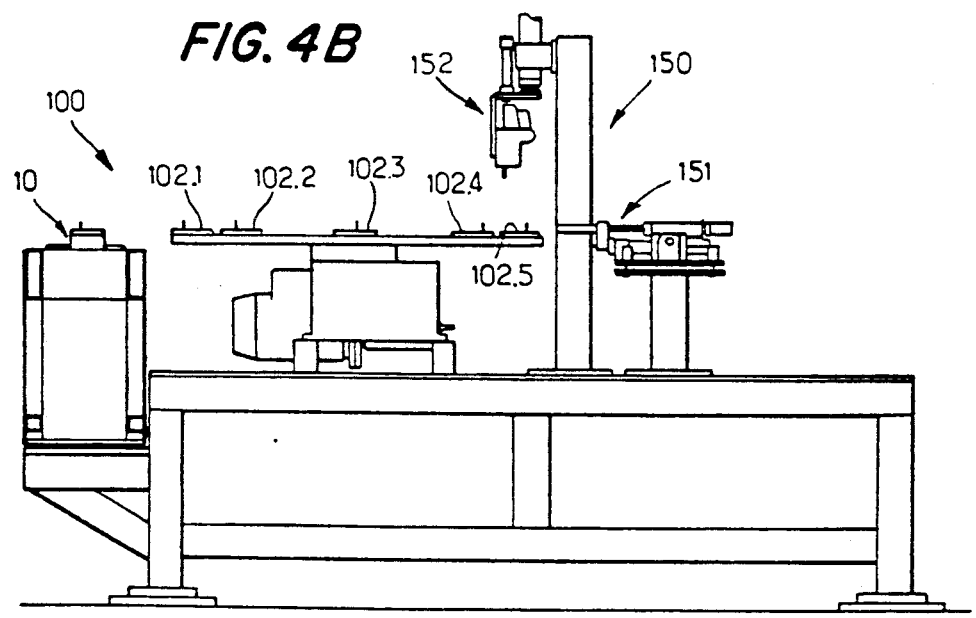

FIGS. 4A and 4B show this equipping station 100 in section and partially for greater clarity. In these figures are shown principally the station 130 for checking the positioning of stop 2 in position 102.3 of the support plate, the station 150 for distributing and positioning the lateral adjustment screw 4 in position 102.5 of the support plate, and station 160 for checking the positioning of the two adjustment screws 3 and 4 in position 102.6.

Figure 5B:
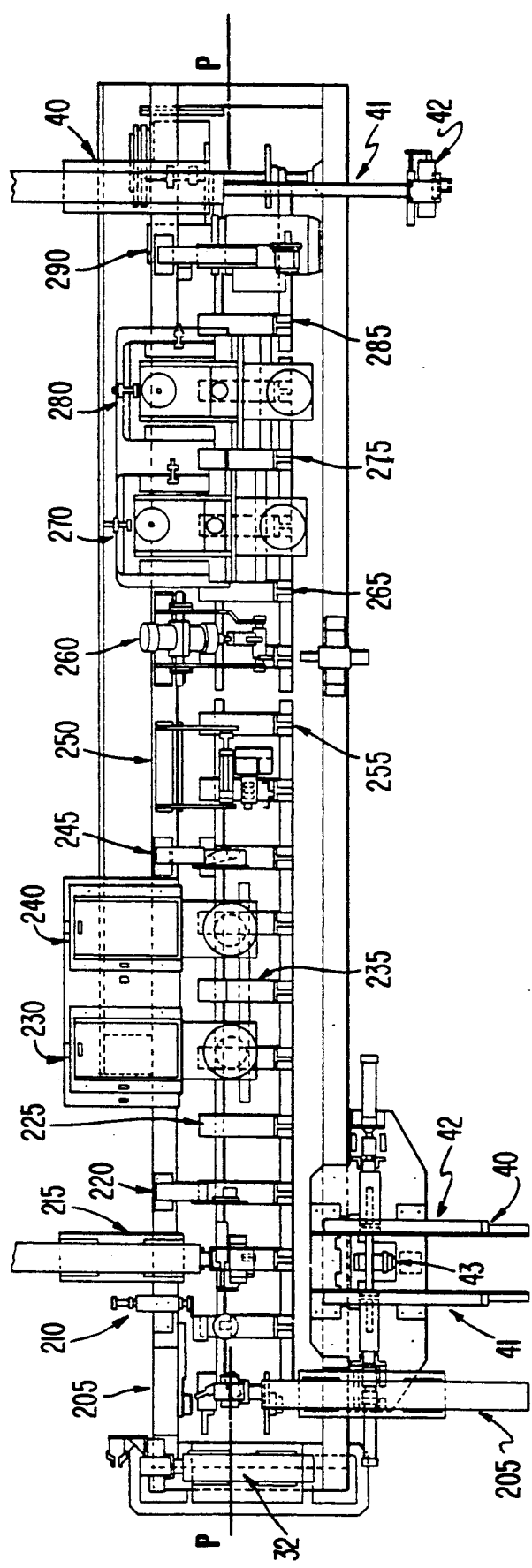

FIGS. 5A and 5B show in elevation and in a top view the installation for automatic assembly of bracket 5 on the equipped socket 1.

This installation 200 comprises several modular stations disposed in a plane PP. To pass from one station to another, the parts are positioned on the support plates 202 disposed on a conveyor of the endless belt type moving step by step from one station to another.

The support plates 202 are adapted so as to deposit and assemble right or left handed sockets 1 and brackets 5.

Figure 7A:
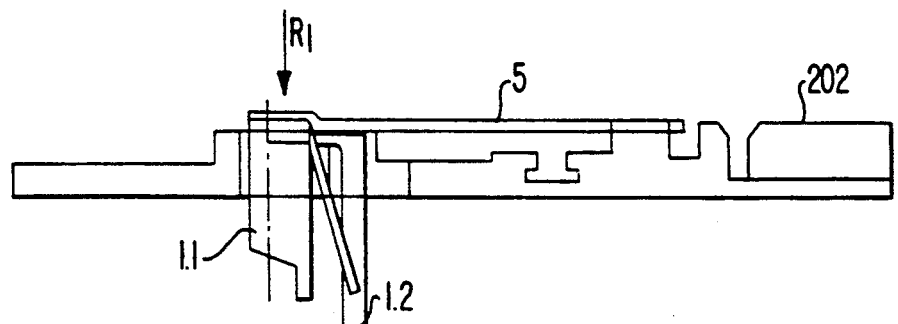
FIGS. 7A and 7B are views, in section through D—D and a top view, of a support plate of the installation for assembling the socket and the bracket with these parts in a first arrangement.

Rotated vertically through 180°, and pivoted horizontally by means of the transfer device 32, socket 1 is deposited on a support plate 202, at a station 205, as can be seen in FIG. 7A.

Figure 7B:
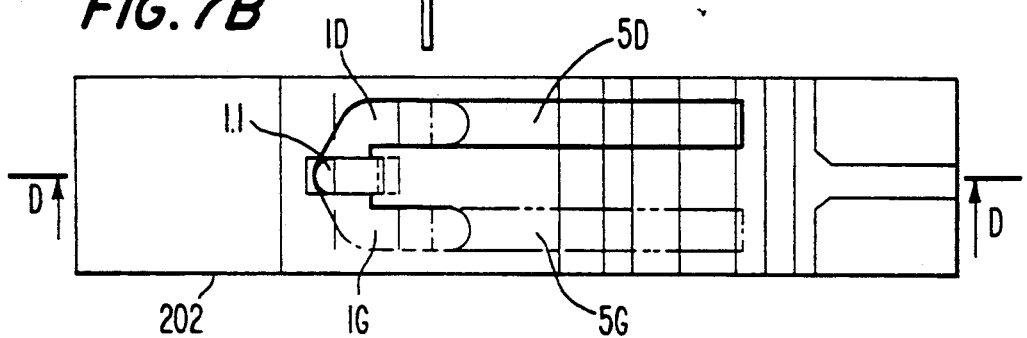

FIG. 7B shows the positioning of the sockets and brackets, right 1D, 5D or left 1G, 5G. The socket portion itself 1.1 is introduced into a transversely central cavity of support plate 202 and portion 1.2 is positioned on one or other side of the central cavity.

Other characteristics of support plate 202 will appear hereafter during the description of the positioning of the parts.

Following the setting station 205 there is provided a greasing station 210.

Laterally to the reference plane PP, in this case, a station 40 is disposed for distributing steel brackets 5. This distributing station 40 comprises two loaders 41, 42, one of which is for loading right-hand brackets and the other for loading left-hand brackets. Between these two loaders 41, 42 is disposed a central distributing slide 43 in a single extended position. Bracket 5 is then positioned with its largest leg horizontal and its shortest leg vertical. A station 215 for setting bracket 5 on socket 1 is provided with grippers which fetch bracket 5 from the distributing slide 43 and set it in grooves of the support plate 202. For this, this setting station is also provided with horizontal and vertical displacement devices, in particular jacks.

Bracket 5 is then positioned on socket 1 as shown in FIG. 7A.

The next station 220 is a station for checking the position of the steel bracket 5 on socket 1, formed preferably of feelers.

The next position 225 of the support plate is without a station and then, at the next movement of the conveyor, the support plate arrives at a station 230 for riveting the first rivet comprising essentially a riveting head with vertical movement.

Depending on the next movement step, the next position 235 of the support plate is without a station and the parts are then transferred to a station 240 for riveting the second rivet, formed similarly to the riveting station 230.

These two riveting operations are shown schematically in FIG. 7A by the arrow R1. Two independent riveting stations are required for the distance between the two rivets is insufficient to carry out simultaneous double riveting.

The riveting is then checked by the checking station 245 then the parts are turned over by the station 250.

Figure 8A:
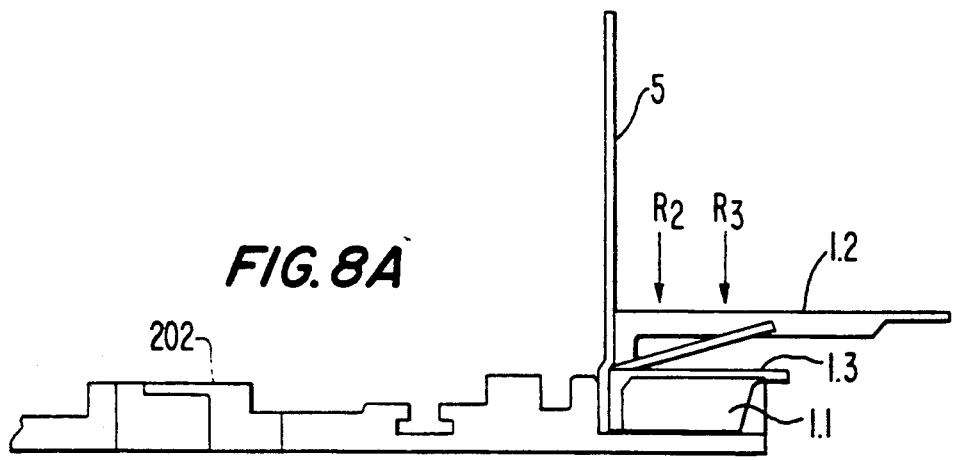
FIGS. 8A and 8B are views, in section through D—D and a top view, of a support plate with the parts in a second arrangement.
Figure 8B:
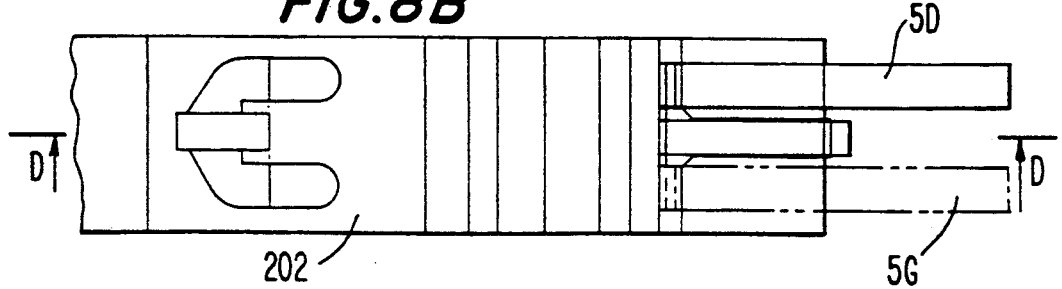

In this latter station, the parts are pivoted horizontally through 90° so as to occupy the position shown in FIG. 8A, the support plate comprising a second arrangement for receiving the pivoted parts.

Passing through a free station 255, the parts then arrive in a station 260 for unbending the steel bracket 5. This station comprises a pressure device ensuring contact of the shortest leg of bracket 5 on surface 1.3 of socket 1.

After a free station 265, the parts are brought to a first riveting station 270 and after another free station 275 to a second riveting station 280. These two riveting stations are similar and two independent riveting stations are required for the distance between the two rivets is not sufficient to allow simultaneous double riveting.

These two riveting operations are shown schematically in FIG. 8A by arrows R2 and R3.

At the level of the unbending 260 and riveting 270, 280 stations may be provided rising bushes 261, 271, 281 for placing the support plates and the workpieces at the right level. These rising bushes are connected together by a common lifting device with horizontal movement controlled by a jack, each rising bush being moved vertically through a double link system.

After a free station 285, the riveting is checked by a checking station 290 comprising feelers checking the absence of difference of level.

The socket-brackets are then equipped and assembled and are discharged through a discharge station 40 comprising grippers with vertical and horizontal movement, the horizontal movement taking place at two levels, a first level 41 where the defective parts are removed and a second level 42 where the correct parts are removed.

Generally, in any installation, the presence and positioning check is double. The setting and assembly stations are provided with an electric checking device transmitting electric data only when the setting and fitting are correctly performed. To this first check is added a second check carried out by the checking stations themselves.

I claim:

1. Installation for the automatic equipping and assembly of elementary parts, in particular parts forming a socket-bracket, formed of a hinge socket with an upper and lateral adjustment screws and a plastic material stop, and a bracket, these two assembled parts forming a right-angle bracket intended to be housed in a rabbet of an opening leaf, particularly an oscillating leaf, the socket being intended to cooperate with an angle support fixed to the frame, which installation comprises an installation for automatically equipping the socket having a rotary step by step bed-plate presenting the socket to:

a station having means for distributing and positioning the upper adjustment screw, a station having means for distributing and positioning the lateral adjustment screw, a station having means for checking positioning of the two adjustment screws, characterized in that, with this installation (100) for automatically equipping the socket (1) is associated an installation (200) for automatically assembling the bracket (5) on the socket (1), via an automatic transfer mechanism (30).

2. Installation according to claim 1, characterized in that the installation (100) for automatically equipping the socket (1) comprises a station (120) for positioning the stop (2).

3. Installation according to claim 2, characterized in that the automatic equipping installation (100) comprises a station (130) checking the positioning of the stop (2).

4. Installation according to claim 1, characterized in that the automatic equipping station (100) comprises from upstream to downstream and in this order:
- a loading station (20, 102.1),
- a station (120, 102.2) for positioning the stop,
- a station (130, 102.3) for checking the positioning of the stop,
- a station (140, 102.4) for distributing and positioning the upper adjustment screw,
- a station (150, 102.5) for distributing and positioning the lateral adjustment screw,
- a station (160, 102.6) for checking the positioning of the adjustment screws,
- an intermediate transfer station (30, 102.7).

5. Installation according to claim 4, characterized in that the transfer station (30) is provided with a mobile chute (31) for removing defective parts.

6. Installation according to claim 1, characterized in that the rotary bed-plate (101) of the installation (100) for equipping the socket (1) rotates in a single rotational direction with a step of one eighth of a revolution, the bed-plate supporting eight support plates (102).

7. Installation according to claim 6, characterized in that the support plates (102) are identical and that each support plate (102) is provided with a tenon (104) and a groove (103) for positioning either a right-hand socket or a left-hand socket.

8. Installation according to claim 1, characterized in that the installation (200) for automatically assembling the bracket (5) on the socket (1) comprises modular work stations disposed in a reference plane (PP), the parts being positioned on support plates (202).

9. Installation according to claim 1, characterized in that the automatic assembly installation (200) comprises:
- a station (205) for depositing the equipped socket (1),
- a greasing station (210),
- a station (215) for depositing the bracket (5) on the socket (1),
- a station (220) for checking the position of the bracket (5) on the socket (1),
- stations (230, 240) for riveting one of the legs of the bracket (5) on the socket (1),
- a station (250) for turning the parts over,
- a station (260) for unbending the bracket (5),
- stations (270, 280) for riveting the other leg of the bracket (5) on the socket (1),
- stations (245, 290) for checking the riveting,
- a station (40) for removing the assembled socket-brackets.

10. Installation according to claim 9, characterized in that, in the automatic assembly installation (200) rising bushes (261, 271, 281) are provided for placing the parts at the right level.

11. Installation according to claim 1, characterized in that laterally to the automatic assembly installation (200) is placed a station (5) for distributing the brackets comprising two loaders (41, 42), one for the right-hand brackets and the other for the left-hand brackets, and a single central distributing slide (43).

12. Installation according to claim 1, characterized in that all the support plates (202) of the assembly station (200) are identical and that each support plate (202) comprises a set of grooves for positioning either right-hand workpieces or left-hand workpieces.

13. Installation according to claim 12, characterized in that the support plate (202) comprises a first arrangement for positioning the workpieces, by means of which the large leg of the bracket (5) is horizontal and a second arrangement for positioning the workpieces, by means of which the small leg of the bracket (5) is horizontal, the socket (1) being positioned in correspondence with the bracket (5).

14. Installation according to claim 3, characterized in that the automatic equipping station (100) comprises from upstream to downstream and in this order:
- a loading station (20, 102.1),
- a station (120, 102.2) for positioning the stop,
- a station (130, 102.3) for checking the positioning of the stop,
- a station (140, 102.4) for distributing and positioning the upper adjustment screw,
- a station (150, 102.5) for distributing and positioning the lateral adjustment screw,
- a station (160, 102.6) for checking the positioning of the adjustment screws,
- an intermediate transfer station (30, 102.7).

15. Installation according to claim 4, characterized in that the installation (200) for automatically assembling the bracket (5) on the socket (1) comprises modular work stations disposed in a reference plan (PP), in the parts being positioned on support plates (202).

16. Installation according to claim 6, characterized in that the installation (200) for automatically assembling the bracket (5) on the socket (1) comprises modular work stations disposed in a reference plan (PP), in the parts being positioned on support plates (202).

17. Installation according to claim 4, characterized in that the automatic assembly installation (200) comprises:
- a station (205) for depositing the equipped socket (1),
- a greasing station (210),
- a station (215) for depositing the bracket (5) on the socket (1),
- a station (220) for checking the position of the bracket (5) on the socket (1),
- stations (230, 240) for riveting one of the legs of the bracket (5) on the socket (1),
- a station (250) for turning the parts over,
- a station (260) for unbending the bracket (5),
- stations (270, 280) for riveting the other leg of the bracket (5) on the socket (1),
- stations (245, 290) for checking the riveting,
- a station (40) for removing the assembled socket-brackets.

18. Installation according to claim 6, characterized in that the automatic assembly installation (200) comprises:
- a station (205) for depositing the equipped socket (1),
- a greasing station (210),
- a station (215) for depositing the bracket (5) on the socket (1),
- a station (220) for checking the position of the bracket (5) on the socket (1),
- stations (230, 240) for riveting one of the legs of the bracket (5) on the socket (1),
- a station (250) for turning the parts over,
- a station (260) for unbending the bracket (5),
- stations (270, 280) for riveting the other leg of the bracket (5) on the socket (1),
- station (290) for checking the riveting,
- a station (40) for removing the assembled socket-brackets.

19. Installation according to claim 7, characterized in that laterally to the automatic assembly installation (200) is placed a station (5) for distributing the brackets comprising two loaders (41, 42), one for the right-hand brackets and the other for the left-hand brackets, and a single central distributing slide (43).

20. Installation according to claim 9, characterized in that laterally to the automatic assembly installation (200) is placed a station (5) for distributing the brackets comprising two loaders (41, 42), one for the right-hand brackets and the other for the left-hand brackets, and a single central distributing slide (43).

* * * * *